(12) United States Patent
Panzner et al.

(10) Patent No.: US 10,557,374 B2
(45) Date of Patent: Feb. 11, 2020

(54) GAS TURBINE AND METHOD FOR PROTECTING A GAS TURBINE IN CASE OF A SHAFT BREAK

(71) Applicant: Rolls-Royce Deutschland Ltd & Co KG, Blankenfelde-Mahlow (DE)

(72) Inventors: Martin Panzner, Koenigs Wusterhausen (DE); Enrique Sielaff, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 315 days.

(21) Appl. No.: 15/646,878

(22) Filed: Jul. 11, 2017

(65) Prior Publication Data

US 2018/0016937 A1      Jan. 18, 2018

(30) Foreign Application Priority Data

Jul. 14, 2016   (DE) .................. 10 2016 113 030

(51) Int. Cl.
   *F01D 21/00*   (2006.01)
   *F04D 29/042*  (2006.01)
   (Continued)

(52) U.S. Cl.
   CPC .............. *F01D 21/006* (2013.01); *F02C 3/04* (2013.01); *F02K 3/06* (2013.01); *F04D 29/042* (2013.01);
   (Continued)

(58) Field of Classification Search
   CPC .... F01D 21/006; F01D 21/045; F04D 29/042; F04D 29/043; F04D 29/044
   See application file for complete search history.

(56) References Cited

U.S. PATENT DOCUMENTS 2,930,184 A    3/1960  Plescia et al.
6,494,032 B2   12/2002 Udall et al.
(Continued)

FOREIGN PATENT DOCUMENTS

EP   1593817 A1   11/2005
EP   2942480 A1   11/2015
(Continued)

OTHER PUBLICATIONS

European Search Report dated Dec. 6, 2017 from counterpart European App No. 17179252.6.
(Continued)

*Primary Examiner* — Woody A Lee, Jr.
*Assistant Examiner* — Christopher R Legendre
(74) *Attorney, Agent, or Firm* — Shuttleworth & Ingersoll, PLC; Timothy J. Klima (57) ABSTRACT

A gas turbine includes a main shaft connecting a turbine to a compressor and an additional shaft extending coaxially to the main shaft. The additional shaft has a first shaft section connected to the compressor and a second shaft section connected to the turbine, the shaft sections separated from each other by a gap. At mutually facing ends, the two shaft sections have mutually corresponding structures. The gap been the two shaft sections is dimensioned such that, upon a break of the main shaft, the mutually corresponding structures of the mutually facing ends of the two shaft sections come into interaction and rotate relative to one another as a result of their differing rotational speeds. The mutually corresponding structures are formed such that the two shaft sections are moved away from one other in the event of twisting of the two shaft sections.

20 Claims, 5 Drawing Sheets

(51) Int. Cl.
    *F04D 29/044*    (2006.01)
    *F02C 3/04*      (2006.01)
    *F02K 3/06*      (2006.01)
    *F16C 3/02*      (2006.01)
(52) U.S. Cl.
    CPC ............ *F04D 29/044* (2013.01); *F16C 3/023* (2013.01); *F05D 2220/323* (2013.01); *F05D 2240/61* (2013.01); *F05D 2260/902* (2013.01)

(56) References Cited

U.S. PATENT DOCUMENTS

| 7,367,774 B2 | 5/2008 | Bourget et al. |
| 2015/0322792 A1 | 11/2015 | Harper |
| 2018/0016937 A1* | 1/2018 | Panzner ................ F01D 21/006 |

FOREIGN PATENT DOCUMENTS

| GB | 2111639 A | 7/1983 |
| GB | 2377731 A | 1/2003 |

OTHER PUBLICATIONS

German Search Report dated Jun. 20, 2017 for counterpart German Application No. 10 2016 113 030.3.

* cited by examiner

GAS TURBINE AND METHOD FOR PROTECTING A GAS TURBINE IN CASE OF A SHAFT BREAK

REFERENCE TO RELATED APPLICATION

This application claims priority to German Patent Application No. 10 2016 113 030.3 filed on Jul. 14, 2016, the entirety of which is incorporated by reference herein.

BACKGROUND

The invention relates to a gas turbine and a method for protecting a gas turbine in case of a shaft break.

A gas turbine comprises a compressor, a combustion chamber, and a turbine. Depending on the type of gas turbine, multiple compressors and turbines can be provided, for example a low-pressure compressor and a high-pressure compressor, as well as a low-pressure turbine and a high-pressure turbine. The turbine is driven by combustion gases of the combustion chamber, in turn driving the compressor via a shaft. For example, a low-pressure turbine drives a low-pressure compressor via the low-pressure shaft (also referred to as an N1 shaft), and a high-pressure turbine drives a high-pressure compressor via a high-pressure shaft (also referred to as an N2 shaft).

In the case that a shaft break occurs in a gas turbine, the turbine is instantly separated from the compressor and is no longer braked by the same. At the same time, the compressor keeps conveying a mass flow for a certain period of time, by which the turbine is accelerated. Therefore, in the event of a shaft break, there is the danger of the now free-running turbine being accelerated beyond a maximally admissible number of revolutions, and of a disc brake occurring. This danger is particularly given in high-pressure turbines, which are typically built without a constructional protection against overspeed. Rather, the maximum overspeed is calculated thermodynamically, and the turbine discs are designed subsequently, wherein it is typically assumed that the maximum overspeed lies at 125% of the maximum regular number of revolutions.

Document GB 2 111 639 A describes a shaft arrangement for a gas turbine that comprises an additional shaft, which, in the case of a shaft break, moves a shaft piece of the broken shaft connected to the turbine downstream in the axial direction via a gearing in order to press the turbine into stationary structures and thus break the turbine discs into small pieces before they all fall off.

Document GB 2 377 731 A describes a shaft arrangement for a gas turbine that has an additional shaft connected to the fan. In case that the low-pressure shaft driving the fan breaks in a section adjoining the fan, the additional shaft couples with that section of the low-pressure shaft that is connected to the low-pressure turbine. The goal here is to make this section of the low-pressure shaft break as well, so that the low-pressure shaft can be axially displaced.

There is a need to provide a gas turbine and a method for protecting a gas turbine in case of a shaft break which offer that kind of protection in an effective manner.

SUMMARY

According to an aspect of the invention, an additional shaft extending coaxially to the main shaft is provided. The additional shaft has a first shaft section and a second shaft section, which are separated from each other by a gap and are thus not in operative connection with each other during operation of the main shaft. The first shaft section is connected to the compressor, and the second shaft section is connected to the turbine. Further it is provided that, at their mutually facing ends, the two shaft sections have mutually corresponding structures.

If the main source breaks, what results is the situation that the two shaft sections develop differing rotational speeds. Thus, the rotational speed of the first shaft section is determined by the rotational speed of the compressor, while the rotational speed of the second shaft section is determined by the rotational speed of the turbine, as the first shaft section is connected to the compressor and the second shaft section is connected to the turbine. Because the turbine is instantly separated from the compressor following a break of the main shaft, these two rotational speeds keep diverging.

This means that the mutually facing ends of the two shaft sections begin rotating at differing speeds. In the course of this process, the mutually corresponding structures of the mutually facing ends of the two shaft sections come to rest against each other or come into interaction with one other. Here, the mutually corresponding structures are formed in such a manner that the two shaft sections are moved away from each other in the event that such a relative twisting of the two shaft sections occurs. As a result, the shaft sections can move only in the axial direction (since they are arranged coaxially within the main shaft). Thus, the two shaft sections are instantly moved away from each other due to the occurring interaction. At that, a force counter to the axial direction is applied to the first shaft section, and a force in the axial direction is applied to the second shaft section.

Because the first shaft section is connected to the compressor, the force acting on the first shaft section is transferred from the first shaft section to the compressor. In the same manner, the force acting on the second shaft section is transferred from the second shaft section to the turbine. In this way, the compressor and the turbine are pressed in a controlled manner into the respective stators or other stationary structures. Thus, the respective friction is increased, counteracting the acceleration of the turbine and braking the compressor more quickly.

Thus, the present invention facilitates braking the rotational movement of the turbine and the compressor in case of a shaft break. As a result, the turbine discs can be designed for a lower maximum number of revolutions. In this manner, weight as well as costs can be economized. In addition, thinner turbine discs have the positive effect that a better thermal expansion leads to smaller tip gaps during transient maneuvers. This results in better efficiencies and lower temperature peaks, which has a positive effect on the service life of the turbine discs.

Further, it is to be understood that the axial displacement of the compressor and the turbine, as facilitated by the invention, is facilitated in a short time, namely within maximally half a relative rotation of the two shaft sections. The material and the thickness of the additional shaft or of the two shaft sections are designed in such a manner that they are able to withstand such a load.

As for the used terminology, it is pointed out that a connection of the first shaft section to the compressor is to be understood in such a way that the first shaft section is connected to a rotating component of the compressor, for example a compressor disc (for example via a flange). Likewise, a connection of the second shaft section to the turbine is to be understood in such a manner that the second shaft section is connected to a rotating component of the turbine. This connection can also be established in such a manner that the first shaft section and/or the second shaft section are coupled to the main shaft, which is in turn connected to the turbine and the compressor. In the same manner, the wording according to which the shaft section transfers a force to the compressor or the turbine is to be understood in such a manner that a force is transferred to the rotating component of the compressor or the turbine.

In one embodiment of the invention it is provided that the two shaft sections are respectively obliquely cut, i.e. beveled at their mutually facing ends. At that, they are aligned in such a manner that the mutually facing ends are aligned so as to be parallel to each other, i.e. so as to lie in parallel planes, during operation of the main shaft. According to this embodiment, the mutually corresponding structures as provided according to the invention are formed by the front surfaces of two cylinders or hollow cylinders that are obliquely cut at one end. Here, the front surfaces are mutually corresponding with regard to their structure insofar as they, if aligned in parallel, complement each other to form a cylindrical or hollow cylindrical shape. After a break of the main shaft has occurred and a relative twisting of the two shaft sections has been caused as a result of that, the two front sides of the beveled ends roll off, with the two shaft sections being moved away from each other.

In a further embodiment of the invention, it is provided that the two shaft sections are respectively formed in a wave-shaped manner at their mutually facing ends. Thus, according to this embodiment, the mutually corresponding structures as provided according to the invention are provided respectively by wave-shaped front surfaces. At that, the front surfaces are corresponding with respect to their structure insofar as both are formed in a wave-shaped manner, wherein in one embodiment variant the period and the amplitude are identical. During operation of the main shaft, wave trough and wave crest are located opposite each other. Following a break of the main shaft and a relative twisting of the two shaft sections caused as a result of that, the front surfaces are rotated relative to one another by the value of the wave crest, so that now wave crest and wave crest come to rest against each other, which leads to an axial displacement.

The shape of the wave can for example be formed by a sine wave or an overlapping of sine waves. The period of the wave shape can for example be chosen in such a manner that the respective front side of a shaft section 1 to 5, in particular 1 or 2, creates undulations, wherein each undulation comprises a wave crest and a wave trough. Thus, in the case of an embodiment as a sine wave, for example 1 to 5, in particular 1 or 2, sine waves are formed at the front sides.

If the two shaft sections are respectively obliquely cut at their mutually facing ends, it is provided in one embodiment of the invention that the angle α, which defines the oblique position of the respectively obliquely cut shaft section end with respect to the axial direction, lies between 10° and 80°, in particular 30° and 60°. However, in principle a different angle can also be provided. Here, the smaller angle, which is formed at the front sides of the two shaft sections that are extending in parallel, is referred to as the angle α.

Following a break of the main shaft, the two shaft sections are displaced with respect to one another by the distance $$d=c\cdot\cos(\alpha)$$

if α is the angle that defines the oblique position of the respectively obliquely cut shaft section end with respect to the axial direction, and c is the length of the hypotenuse of the cut-off shaft section in the side view. As a direct result thereof, the smaller the angle α, the stronger the two shaft sections are moved away from each other either in the axial direction or counter to the axial direction. Accordingly, the braking effect exerted by the two shaft sections on the turbine and the compressor is stronger with smaller angles of α. In any case, the invention provides a defined axial displacement of the shaft section, and thus of the turbine and the compressor.

In a further embodiment of the invention it is provided that one shaft section forms a pilot pin at its end, with the pilot pin protruding into the other shaft section. In this manner, an axial guidance of the two shaft sections is ensured as they move away from each other. In addition, the stability of the system is increased.

The additional shaft is usually embodied as a hollow shaft, and thus the two shaft sections of the additional shaft are usually embodied as hollow cylinders. In the case that one or multiple other shafts extend within the main shaft, it is always obligatory that the additional shaft or its two shaft sections are embodied as hollow shafts. Only then this is not the case if the main shaft is the low-pressure shaft of the gas turbine, or if the gas turbine has only one shaft. In one embodiment, the two shaft sections are formed by hollow cylinders that are obliquely cut at one end.

In an additional shaft that is embodied as a hollow cylinder, the front surfaces of the two shaft sections, which form the mutually corresponding structures and come into interaction with each other if a break of the main shaft occurs as a result of the difference in the rotational speeds of the two shaft sections that is initiated in that case, are ring-shaped.

According to one embodiment, the ring-shaped front surfaces of the two shaft sections, which are separated from each other by a gap during operation of the main shaft and come into interaction with each other if a break of the main shaft occurs, extend in parallel to each other. For example, if the two shaft sections are respectively obliquely cut at their mutually facing ends, they are beveled in the same manner as the mutually facing ends of the shaft sections are beveled in their entirety. However, this is not necessarily the case. During an interaction of the ring-shaped front surfaces, the two shaft sections are moved away from each other safely and without any breaks occurring. At that, the radial extension of the front surfaces is determined by the wall thickness of the hollow-cylindrical shaft sections.

In principle, the present invention can be used with any desired main shaft. Thus, in an engine with two shafts, the main shaft embodied according to the invention can be the high-pressure shaft or the low-pressure shaft. In an engine with three shafts, the main shaft embodied according to the invention can be the high-pressure shaft, the medium-pressure shaft, or the low-pressure shaft. However, in an advantageous embodiment of the invention it is provided that the main shaft is a high-pressure shaft, coupling the high-pressure turbine to the high-pressure compressor. After all, high-pressure shafts and dedicated turbines have so far been built without constructional protection against overspeed.

The invention also relates to a turbofan engine comprising a gas turbine.

The invention also relates to a method for protecting a gas turbine in case of a shaft break. It is provided that, in the event of a break of the main shaft, a force in the axial direction is applied to the turbine, and a force counter to the axial direction is applied to the compressor by means of an additional shaft that extends coaxially to the main shaft. Here, the additional shaft has a first shaft section connected to the compressor and a second section connected to the turbine, which are separated from each other by a gap. At their mutually facing ends, the two shaft sections have mutually corresponding structures. If a break of the main shaft occurs, the mutually corresponding structures of the mutually facing ends of the two shaft sections come into interaction with one other as a result of a difference in rotational speeds of the two shaft sections that is then initiated, moving the two shaft sections away from each other in the course of that process.

BRIEF DESCRIPTION OF THE DRAWINGS

The invention will be explained in more detail on the basis of exemplary embodiments with reference to the accompanying drawings in which.

DETAILED DESCRIPTION

Figure 1:
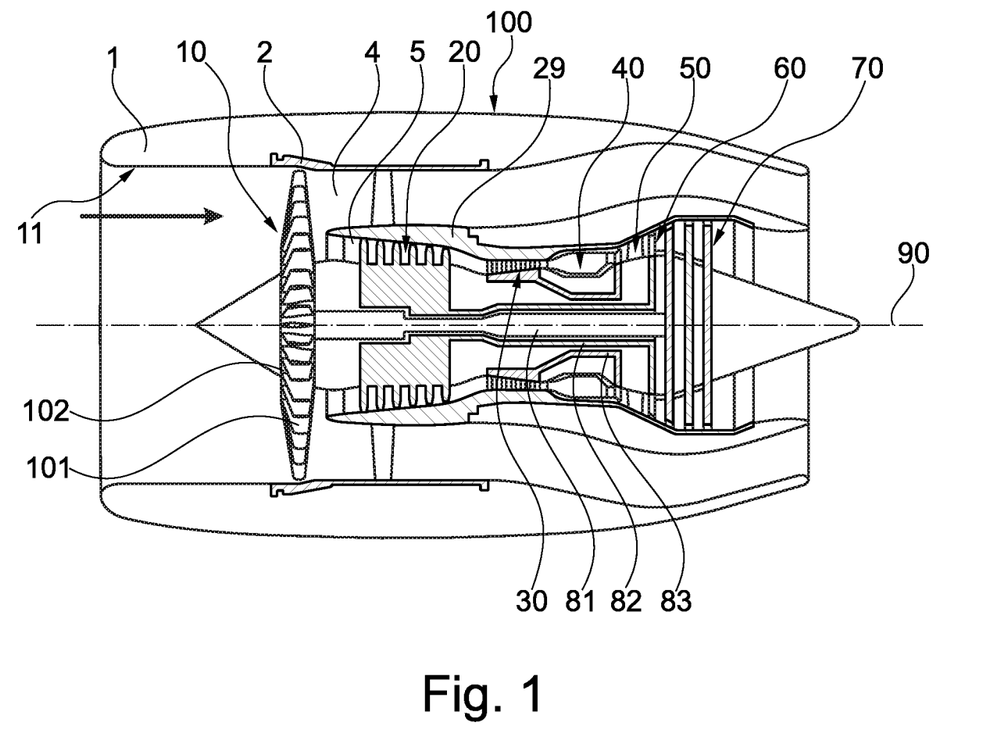
FIG. 1 shows a simplified schematic sectional view of a turbofan engine in which the present invention can be realized.

FIG. 1 shows, in a schematic manner, a turbofan engine 100 that has a fan stage with a fan 10 as the low-pressure compressor, a medium-pressure compressor 20, a high-pressure compressor 30, a combustion chamber 40, a high-pressure turbine 50, a medium-pressure turbine 60, and a low-pressure turbine 70.

The medium-pressure compressor 20 and the high-pressure compressor 30 respectively have a plurality of compressor stages that respectively comprise a rotor stage and a stator stage. The turbofan engine 100 of FIG. 1 further has three separate shafts, namely a low-pressure shaft 81 which connects the low-pressure turbine 70 to the fan 10, a medium-pressure shaft 82 which connects the medium-pressure turbine 60 to the medium-pressure compressor 20, and a high-pressure shaft 83 which connects the high-pressure turbine 50 to the high-pressure compressor 30. However, this is to be understood to be merely an example. If, for example, the turbofan engine has no medium-pressure compressor and no medium-pressure turbine, only a low-pressure shaft and a high-pressure shaft would be present.

The turbofan engine 100 has an engine nacelle 1 that forms an engine inlet 11 at the entry side, supplying inflowing air to the fan 10. The fan 10 has a plurality of fan blades 101 that are connected to a fan disc 102. Here, the annulus of the fan disc 102 forms the radially inner delimitation of the flow path through the fan 10. Radially outside, the flow path is delimited by the fan housing 2. Upstream of the fan-disc 102, a nose cone is arranged.

Behind the fan 10, the turbofan engine 100 forms a secondary flow channel 4 and a primary flow channel 5. The primary flow channel 5 leads through the core engine (gas turbine) which comprises the medium-pressure compressor 20, the high-pressure compressor 30, the combustion chamber 40, the high-pressure turbine 50, the medium-pressure turbine 60, and the low-pressure turbine 70. At that, the medium-pressure compressor 20 and the high-pressure compressor 30 are surrounded by a circumferential housing 29 which forms an annulus surface at the internal side, delimitating the primary flow channel 5 radially outside. Radially inside, the primary flow channel 5 is delimitated by corresponding rim surfaces of the rotors and stators of the respective compressor stages, or by the hub or by elements of the corresponding drive shaft connected to the hub.

During operation of the turbofan engine 100, a primary flow flows through the primary flow channel 5. The secondary flow channel 4, which is also referred to as the partial-flow channel, sheath flow channel, or bypass channel, guides air sucked in by the fan 10 during operation of the turbofan engine 100 past the core engine.

The described components have a common symmetry axis 90. The symmetry axis 90 defines an axial direction of the turbofan engine. A radial direction of the turbofan engine extends perpendicularly to the axial direction.

In the context of the present invention, the embodiment of the shafts, which respectively connect and couple the turbine and the compressor with each other, is of particular importance. Here, the invention will be explained in the following based on the high-pressure shaft that couples the high-pressure turbine and the [high-pressure compressor] with each other. However, this is to be understood merely as an example. The invention can be embodied in a corresponding manner with respect to the medium-pressure shaft or with respect to the low-pressure shaft. In addition, in principle the invention can also be realized with a single-shaft gas turbine.

Figure 2:
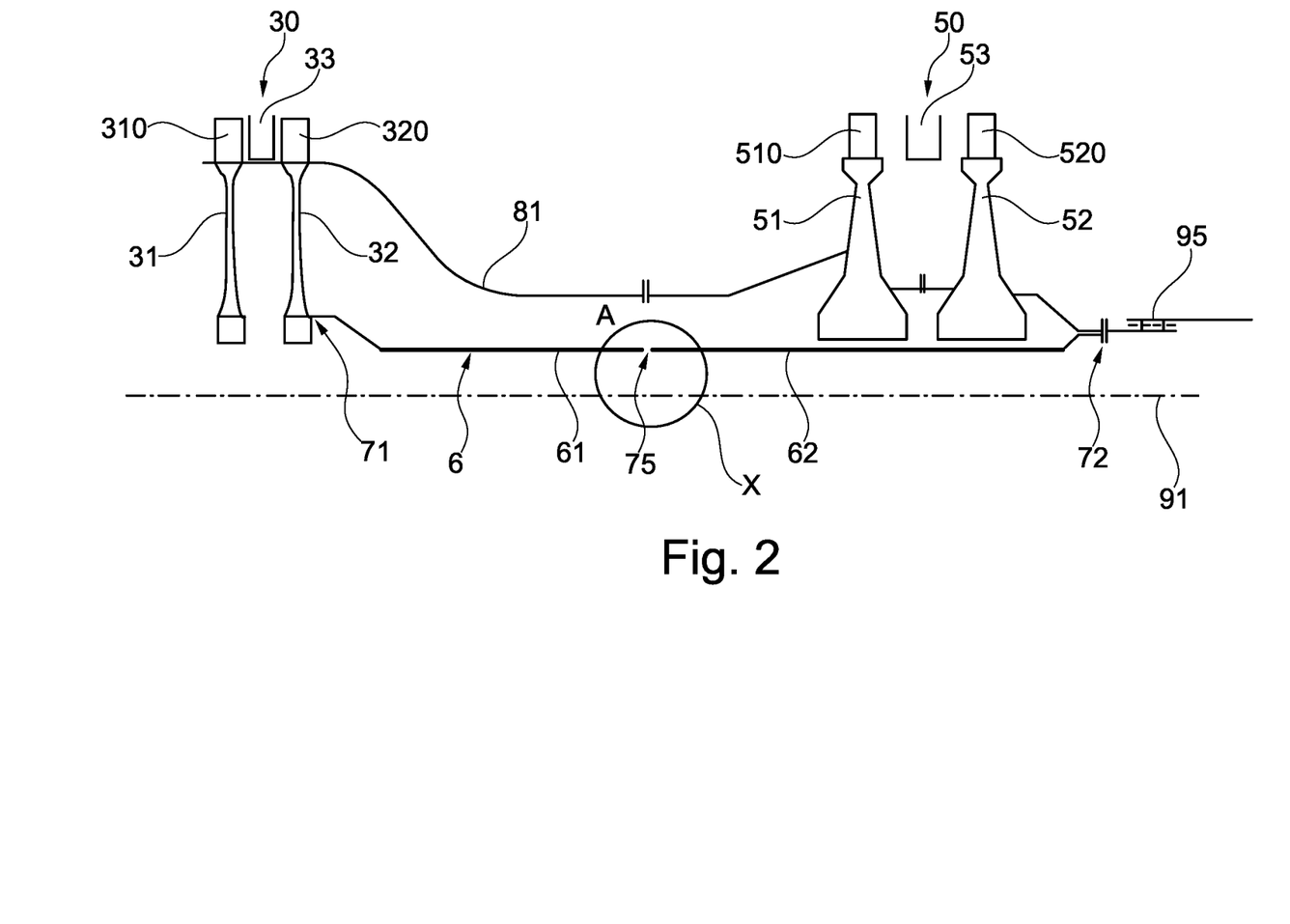
FIG. 2 shows a schematic rendering of a shaft arrangement with a high-pressure shaft and an additional shaft, wherein the high-pressure shaft couples a high-pressure turbine with a high-pressure compressor, and wherein the additional shaft is provided and embodied for the purpose of respectively axially displacing the high-pressure turbine and the high-pressure compressor in case a break of the high-pressure shaft occurs.

FIG. 2 shows, in a schematic manner, a gas turbine according to the invention, which is for example embodied in an aircraft gas turbine and has a main shaft 81 as well as an additional shaft 6. In the shown exemplary embodiment, the main shaft 81 is a high-pressure shaft that couples a high-pressure turbine 50 and a high-pressure compressor 30 to each other. A combustion chamber that is arranged between the high-pressure compressor 30 and the high-pressure turbine 50 is not shown.

The high-pressure compressor 30 comprises compressor discs 31, 32 that form rotor blades 310, 320 at their radially outer ends. Here, the compressor discs 31, 32 with the rotor blades 310, 320 represent rotating elements of the high-pressure compressor 30. The main shaft 81 is connected to at least one of the compressor discs 31, 32 via attachment means that are not shown in any more detail. In a per se known manner, the high-pressure compressor 30 further comprises stator blades 33, of which one is shown in a schematic and exemplary manner in FIG. 2.

The high-pressure turbine 50 comprises turbine discs 51, 52 that form rotor blades 510, 520 at their radially external ends. The turbine discs 51, 52 with the rotor blades 510, 520 represent rotating elements of the high-pressure turbine 50. The main shaft 81 is connected to at least one of the turbine discs 51, 52 via attachment means that are not shown in any more detail. In a per se known manner, the high-pressure turbine 50 further comprises stator blades 53, of which one is shown in a schematic and exemplary manner in FIG. 2.

The additional shaft 6 extends inside the main shaft 81 and coaxially with respect to the rotational axis 91 of both shafts, which is usually identical with the symmetry axis 90 of FIG. 1. The additional shaft 6 comprises a first shaft section 61 and a second shaft section 62. The first shaft section 61 is connected to the high-pressure compressor 30, and the second shaft section 62 is connected to the high-pressure turbine 50.

In general, the respective connection can be of any desired type. For example, the first shaft section 61 is connected 71 to the one compressor disc 32 via a flange connection, which is not shown in any more detail. Further, it can for example be provided that the second shaft section 62 is coupled to the main shaft 81 in a connection area 72, whereby a connection to the rotating elements 51, 52 of the high-pressure turbine 50 is indirectly established. Thus, the connection of the respective shaft section 61, 62 to the compressor 30 or the turbine 50 can be established directly or indirectly.

The main shaft 81 as well as the additional shaft 6 or the two shaft sections 61, 62 forming the additional shaft 6 are embodied as hollow shafts.

In the nominal state, that is, when the main shaft 81 is in operation and not broken, the two shaft sections 61, 62 are separated from each other by a gap 75, so that no operative connection between the two shaft sections 61, 62 is present in the nominal state. Accordingly, the rotational speed of the first shaft section 61 is determined by the rotational speed of the high-pressure compressor 30 or its rotating parts 31, 32. In a corresponding manner, the rotational speed of the second shaft section 62 is determined by the rotational speed of the high-pressure turbine 50 or its rotating parts 51, 52. Since, due to the connection via the main shaft 81, the rotational speed of the high-pressure turbine 50 and the high-pressure compressor 30 are identical in the nominal state, the two shaft sections 61, 62 are also rotating at the same speed in the nominal state. Thus, their relative position with respect to one another is unchanging or constant in the nominal state.

FIG. 2 further shows a floating bearing 95 of the main shaft 81 in a schematic manner.

It is to be understood that further shafts can be located within the additional shaft 6, with the further shafts also being embodied so as to be coaxial to the rotational axis 91. They may for example be a low-pressure shaft in a two-shaft engine, or a medium-pressure shaft and a low-pressure shaft in a three-shaft engine.

The additional shaft 6 with the two shaft sections 61, 62 is provided and embodied for the purpose of axially displacing the high-pressure turbine 50 as well as the high-pressure compressor 30 in the case of a break of the main shaft 81, and namely counter to the axial direction. This will be explained in more detail in the following based on FIGS. 2 to 5.

Figure 3:
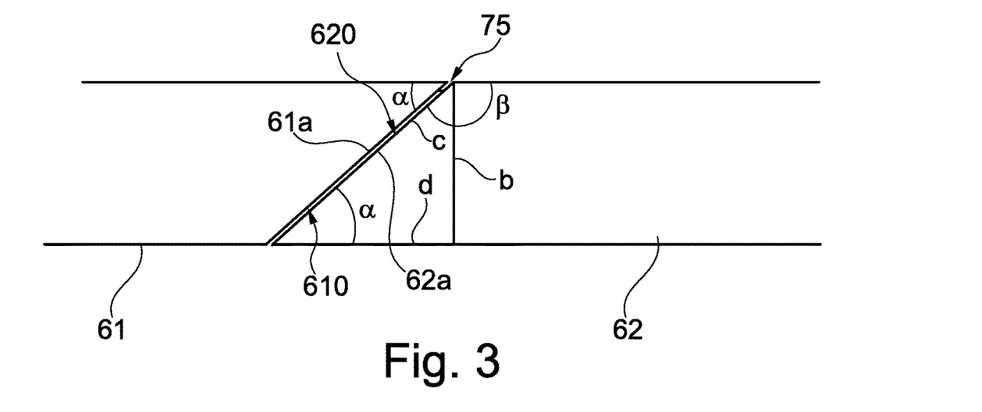
FIG. 3 shows, in a side view, an exemplary embodiment of an additional shaft that has two shaft sections with beveled and mutually facing ends, wherein the two shaft sections are shown in a first position in FIG. 3, which is present during normal operation of the high-pressure shaft.

FIG. 3 is an enlarged rendering of the additional shaft 6 in the area X of FIG. 2, in which the two shaft sections 61, 62 adjoin each other and form a gap 75 in between them in the nominal state. At that, it is provided that the two shaft sections 61, 62 are respectively obliquely cut, i.e. that they are beveled across their entire diameter at their mutually facing ends 61a, 62a. Thus, from the mathematical point of view, the shaft sections 61, 62 are embodied as hollow cylinders that are obliquely cut at an end 61a, 62a. What follows from this is that the front surfaces 610, 620 forming the shaft sections 61, 62 at their mutually facing ends 61a, 62a, respectively form an annular surface. The shape of the annular surface is elliptical, since, when a cut is made through an end of a straight circular cylinder obliquely with a plane, an ellipse is created as the cutting curve. Thus, the ring-shaped front surfaces 610, 620 have the shape of an ellipse.

Further, it is provided that the two shaft sections 61, 62 are aligned in such a manner that the mutually facing ends 61a, 62a are aligned in parallel in the nominal state, i.e. during operation of the main shaft. In other words, the front surfaces 610, 620 that form the mutually facing ends 61a, 62a lie in planes that extend in parallel to each other. At that, the front surfaces 610, 620 are positioned at a small distance from each other to form the gap 75 in between them.

FIG. 3 also shows two angles $\alpha$ and $\beta$ which define the oblique position of the respective obliquely cut shaft section end 61a, 62a. Together, the two angles $\alpha$, $\beta$ cover 180°. Here, it is the smaller angle $\alpha$ which is regarded as the angle defining the oblique position. In the following, the present geometric relationships are explained to provide a better understanding of the function of the invention, which will be explained based on FIG. 4. This is done based on the geometric relationships as resulting in the side view shown in FIG. 3. This makes it possible to regard planimetric values in a simplified manner. Alternatively, it is also possible to regard the planes in which the front surfaces 610, 620 lie.

In the following, the second shaft section 62 is regarded. Corresponding geometric relationships also apply to the first shaft section 61. According to FIG. 3, the second shaft section 62 has an outer diameter b. In the side view, the front surface 620 of the obliquely cut end 62a forms an oblique line c. The axial elongation which is provided due to the obliquely cut end is referred to as d. C is the hypotenuse in the right angle formed by the line segments b, c, and d. Accordingly, the sine of the angle $\alpha$ equals b/c, and the cosine of the angle $\alpha$ equals d/c.

Now, the functional principle of the invention will be explained based on FIG. 4. In case of a shaft break, the two shaft sections 61, 62 develop differing rotational speeds. This is associated with the fact that the rotational speed of the second shaft section 62 equals the rotational speed of the rotating parts of the high-pressure turbine 50 (cf. FIG. 2). The latter is increased following a shaft break, since the turbine is now free-running. The rotational speed of the first shaft section 61 equals the rotational speed of the rotating parts of the high-pressure compressor 30, the rotation of which is slowly reduced following a shaft break.

Accordingly, following the shaft break, a relative rotational movement between the two shaft sections 61, 62 is initiated. This leads to the two front surfaces 610, 620, which in the nominal state are separated by a gap 75, now coming into contact with one another. Here, the gap 75 is dimensioned so as to be sufficiently small for this to occur. Because of the oblique position of the ends 61a, 62a and due to the fact that the two shaft sections 61, 62 can only be displaced in the axial direction, the front surfaces 610, 620 roll off in such a manner that the two shaft sections 61, 62 are instantly moved away from each other, wherein the shaft section 61 is displaced counter to the axial direction, and the shaft section 62 is displaced in the axial direction.

Figure 4:
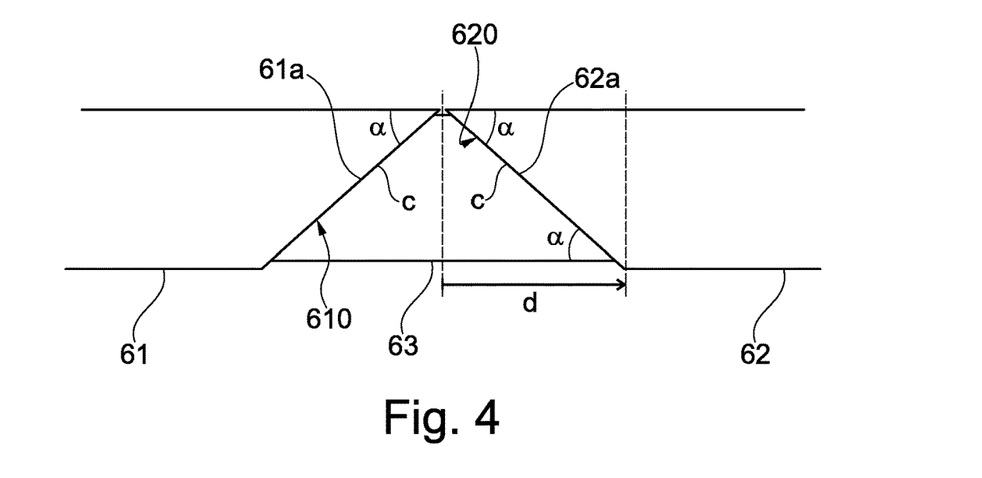
FIG. 4 shows the additional shaft of FIG. 3, wherein the two shaft sections are shown in a second position as taken by the shaft sections following a break of the high-pressure shaft as a result of the differing rotational speeds of the two shaft sections that occur in that event, and wherein a pilot pin is shown as a further constructional detail, being connected with the one shaft section and protruding into the other shaft section.

FIG. 4 shows the end phase of such a relative movement or axial displacement between the two shaft sections 61, 62. This end phase is reached already after half a relative rotation of the two shaft sections 61, 62. As for the total displacement d, one has:

$$d = c \cdot \cos(\alpha)$$

Each shaft section has been displaced by the axial distance d/2.

In order to guide the displacement of the shaft sections 61, 62, a pilot pin 63 can additionally be provided, protruding from the shaft section 61 and projecting into the shaft section 62 (or the other way around). The pilot pin 63 is attached at the shaft section 61. The pilot pin 63 ensures an exact axial guidance of the two shaft sections 61, 62 as they are being axially displaced. It increases the stability of the system and in particular ensures that the shaft sections (61, 62) are not bent up transversely to the longitudinal axis in the course of their interaction.

The axial displacement by the value d/2 of the shaft section 62 leads to the rotor blades 510, 520 of the high-pressure turbine being pressed into the respective stators 53, or it leads to this being effected with particular force. In this manner, the acceleration of the turbine 50, as it is initiated following the break of the main shaft, is counteracted by the accompanying friction. Further, the axial displacement by the value d/2 of the shaft section 61 leads to the rotor blades 310, 320 of the high-pressure compressor being pressed into the respective stators 33. A faster braking of the compressor 30 is performed, with the pressure inside the compressor being reduced more quickly following a shaft break.

For example, the distance between the rotor blades 510 and the stator blades 53 in the high-pressure turbine is 4 mm (cf. FIG. 2). If the value d of the axial displacement exceeds 4 mm, it is thus already achieved that, following a break of the main shaft 81, the rotor blades 510 of the turbine 50 come into contact with the stator blades 53 (or that the establishment of such a contact is reinforced), and braking of the rotation of the high-pressure turbine 50 is performed.

Depending on the structural embodiment of the compressor or the turbine, the rotor blades 310, 320, 510, 520 or other rotating parts of the compressor 30 or the turbine 50 can also come into contact with static parts of the compressor or the turbine other than the stators 33, 53 in order to dissipate energy. Energy dissipation can also be achieved by additional friction in the respective axial bearings, which is made available by the axial displacement or by the forces that act during the same.

Figure 5:
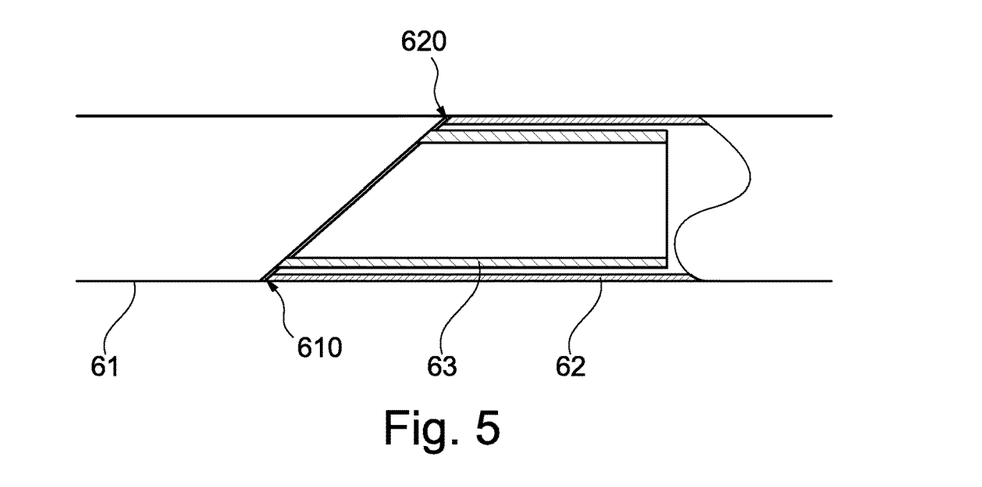
FIG. 5 shows a partial section view of the additional shaft of FIGS. 3 and 4, wherein the one shaft section and the pilot pin protruding into the same are shown in a sectional view.

As can be clearly seen from the partially sectioned view of FIG. 5, the shaft sections 61, 62 are hollow cylinders (wherein only the shaft section 62 is shown in a sectioned manner). The front surfaces 610, 610 of the ends 61a, 62a of the shaft sections 61, 62 are embodied in a ring-shaped manner. Their radial extension is predetermined by the thickness of the hollow cylinder.

Figure 6:
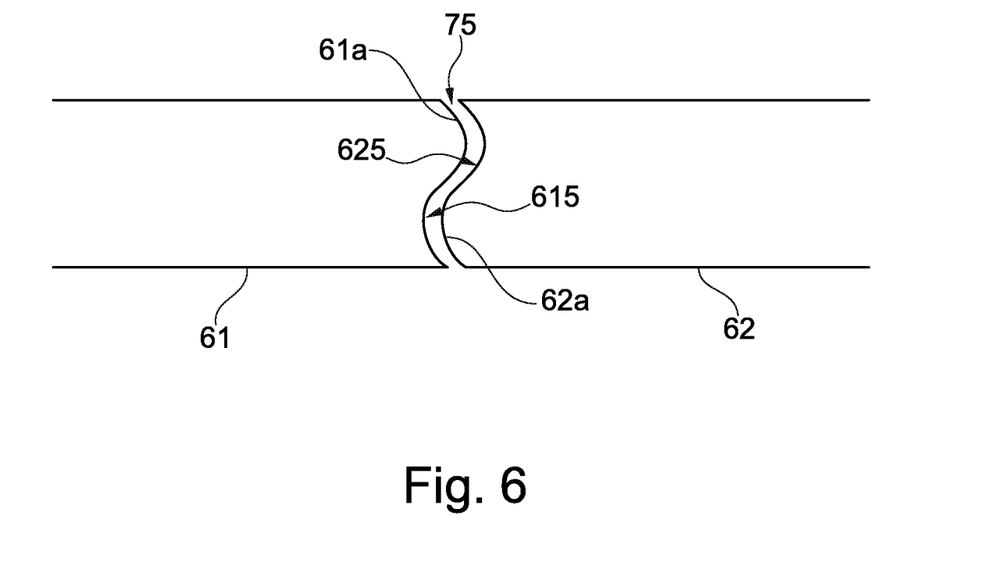
FIG. 6 shows, in a side view, a further exemplary embodiment of an additional shaft having two shaft sections with mutually facing ends, wherein the ends are respectively formed in a wave-shaped manner.

FIG. 6 shows an alternative exemplary embodiment, in which the front sides 615, 625 of the adjoining ends 61a, 62a of the two shaft sections 61, 62 that are separated from each other by a gap 75 are formed in a wave-shaped manner. The wave shape is formed by a sine wave, for example. In the shown exemplary embodiment, respectively two undulations are realized in the front surfaces 615, 625, wherein only one of the undulations can be seen in the side view of FIG. 6. Each undulation comprises a wave crest and a wave trough. In alternative embodiment variants, only one undulation or more than 2 undulations are realized in the front surfaces 615, 625.

Due to their respective wave shapes, the front sides 615, 625 form mutually corresponding structures. At that, it is provided that the wave shapes realized at the two front sides 615, 625 have the same period as well as the same amplitude.

During operation of the main shaft, the two shaft sections 61, 62 are aligned with respect to one another in such a manner that wave crest and wave trough are respectively positioned opposite each other at the front sides 615, 625, as shown in FIG. 6. If a break of the main shaft occurs, the two shaft sections 61, 62 are twisted relative to one another, as described. As a result, after a relative twisting by half a period (i.e. by the value of a wave crest), wave crest comes to rest against wave crest at the front sides 615, 625, which is accompanied by the axial displacement of the two shaft sections 61, 62.

In this embodiment, the total displacement of the two shaft sections 61, 62 depends on the amplitude of the wave shape. The larger the amplitude, the stronger the axial displacement. Here, the ratio of the amplitude to the period is selected in such a manner that twisting of the two shaft sections 61, 62 at their front sides 615, 625 is not obstructed relative to one another.

Figure 7:
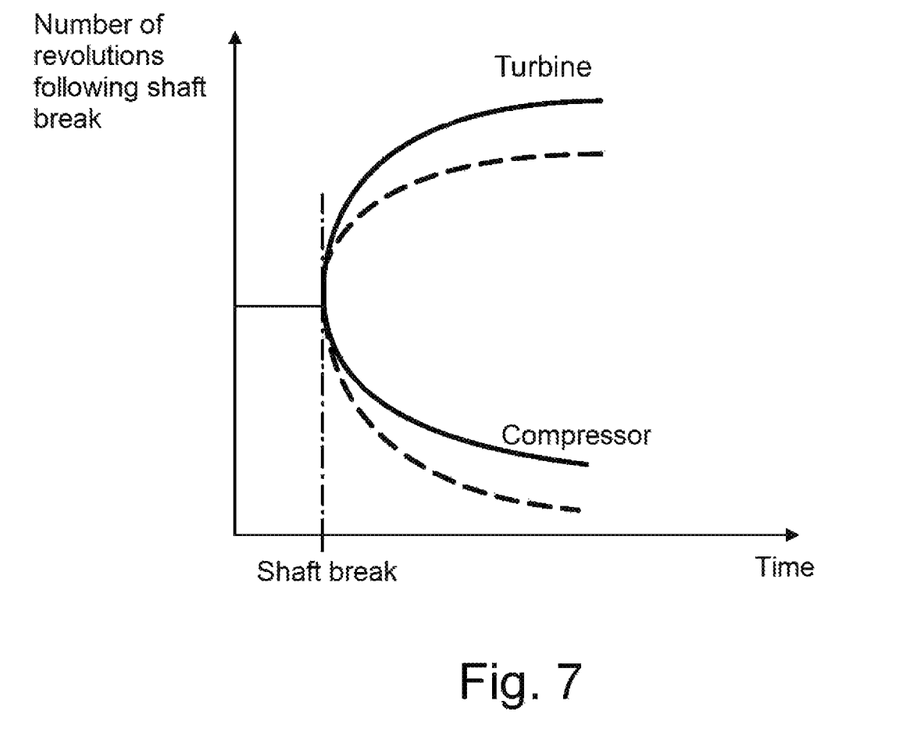
FIG. 7 shows the development of the number of revolutions of the turbine and of the compressor in the event of a shaft break as a function of time, with the development of the number of revolutions being shown according to the state of the art as well as with the use of the present invention.

FIG. 7 shows the development of the number of revolutions of the turbine and the compressor in case of a shaft break, wherein the development is shown as a function of time, starting with the occurrence of the shaft break. The solid line shows the development in a gas generator which is embodied without an additional shaft according to the invention. The dashed line shows the development in a gas generator that is embodied with the additional shaft according to the invention.

In principle, the number of revolutions of the turbine increases following a shaft break, and the number of revolutions of the compressor is reduced in the event of a shaft break. Thanks to the invention and the braking effect on the rotation of the turbine and the compressor that is provides, it is achieved that the acceleration of the turbine is reduced, and the braking action on the compressor is accelerated after a shaft break has occurred.

As for its embodiment, the present invention is not limited to the above-described exemplary embodiments, which are to be understood merely as examples. For example, the invention has been described above based on a turbofan engine. However, the invention can be realized in the same manner in any other gas turbine. It should also be pointed out that the concrete embodiment of the ends of the two shaft sections is to be understood to be merely an example. Thus, the mutually corresponding structures at the ends of the two shaft sections can be embodied in a different manner than has been described, for example in the form of other elevations and indentations, which are embodied in a corresponding manner at the respective ends.

It is furthermore pointed out that the features of the individually described exemplary embodiments of the invention can be combined in various combinations with one another. Where areas are defined, they include all the values within these areas and all the sub-areas falling within an area.

What is claimed is:

1. A gas turbine, comprising:
   a turbine,
   a compressor that is arranged upstream of the turbine, a main shaft extending in an axial direction and connecting the turbine to the compressor, and a first shaft section and a second shaft section, which are separated from each other by a gap at mutually facing ends thereof and extending coaxially with respect to the main shaft, wherein the first shaft section is connected to the compressor, and the second shaft section is connected to the turbine, at the mutually facing ends, the first and second shaft sections including mutually corresponding structures, the gap between the first and second shaft sections being dimensioned in such a manner, that upon a break of the main shaft, the mutually corresponding structures of the mutually facing ends of the first and second shaft sections come into interaction and rotate relative to one another as a result of a difference in rotational speeds of the first and second shaft sections that is then initiated, and the mutually corresponding structures are embodied in such a manner that the first and second shaft sections are moved away from each other if such relative rotation of the first and second shaft sections occurs.

2. The gas turbine according to claim 1, wherein the first and second shaft sections are respectively obliquely cut at the mutually facing ends and aligned in such a manner during operation of the main shaft that the mutually facing ends lie in parallel planes.

3. The gas turbine according to claim 2, wherein an angle ($\alpha$), which defines the obliquely cut ends of the first and second shaft sections with respect to the axial direction, lies been 10° and 80°.

4. The gas turbine according to claim 2, wherein when the first and second shaft sections move away from each other, they are displaced with respect to one another by a distance $c \cdot \cos(\alpha)$, wherein $\alpha$ is an angle that defines the obliquely cut ends of the first and second shaft sections with respect to the axial direction, and c is a length of the mutually facing ends of the first and second shaft sections.

5. The gas turbine according to claim 1, wherein the first and second shaft sections are respectively wave-shaped at the mutually facing ends.

6. The gas turbine according to claim 1, wherein, upon the break of the main shaft, the first shaft section is configured to receive a force counter to the axial direction and to transfer this force to the compressor.

7. The gas turbine according to claim 1, wherein, upon the break of the main shaft, the second shaft section is configured to receive a force in the axial direction and to transfer this force to the turbine.

8. The gas turbine according to claim 1, wherein one of the first and second shaft sections includes a pilot pin protruding into the other of the first and second shaft sections.

9. The gas turbine according to claim 1, wherein the first and second shaft sections are hollow cylinders.

10. The gas turbine according to claim 1, wherein the turbine is a high-pressure turbine and the compressor is a high-pressure compressor.

11. A turbofan engine comprising the gas turbine of claim 1.

12. A gas turbine, comprising:
a high-pressure turbine,
a high-pressure compressor that is arranged upstream of the high-pressure turbine,
a main shaft extending in an axial direction and connecting the high-pressure turbine to the high-pressure compressor, and a hollow first shaft section and a hollow second shaft section, which are separated from each other by a gap at mutually facing ends thereof and extending coaxially with respect to the main shaft, wherein the first shaft section is connected to the compressor, and the second shaft section is connected to the turbine, at their mutually facing ends, the first and second shaft sections include mutually corresponding structures, the gap between the first and second shaft sections is dimensioned in such a manner, that upon a break of the main shaft, the mutually corresponding structures of the mutually facing ends of the first and second shaft sections come into interaction and rotate relative to one another as a result of a difference in rotational speeds of the first and second shaft sections that is then initiated, and the mutually corresponding structures are embodied in such a manner that the first and second shaft sections are moved away from each other if such relative rotation of the first and second shaft sections occurs.

13. A method for protecting a gas turbine in case of a main shaft break, wherein the gas turbine includes a turbine, a compressor arranged upstream of the turbine, and the main shaft extending in an axial direction and connecting the turbine to the compressor, comprising:

providing a first shaft section that is connected to the compressor and a second shaft section that is connected to the turbine, the first shaft section and the second shaft section extending coaxially with respect to the main shaft and being separated from each other by a gap at mutually facing ends thereof, and, at their mutually facing ends, having mutually corresponding structures, and wherein upon breaking of the main shaft, providing that the mutually corresponding structures of the mutually facing ends of the first and second shaft sections come into interaction with each other as a result of differing rotational speeds of the first and second shaft sections that cause application of a force in the axial direction to the turbine and a force counter to the axial direction to the compressor such that the first and second shaft sections are moved away from each other.

14. The method according to claim 13, wherein the second shaft section transfers the force in the axial direction to the turbine.

15. The method according to claim 14, wherein, due to the force transferred by the second shaft section, the turbine is pressed into stators or other non-rotating structures, and is braked in this manner.

16. The method according to claim 13, wherein the first shaft section transfers the force counter to the axial direction to the compressor.

17. The method according to claim 16, wherein, due to the force transferred by the first shaft section, the compressor is pressed into stators or other non-rotating structures, and is braked in this manner.

18. The method according to claim 13, wherein, at their mutually facing ends, the first and second shaft sections are respectively obliquely cut, wherein the first and second shaft sections being moved away from each other occurs at a relative twisting by 180° therebetween.

19. The method according to claim 18, wherein when the first and second shaft sections move away from each other, they are displaced by a distance $c \cdot \cos(\alpha)$ with respect to one another, wherein $\alpha$ is an angle that defines the obliquely cut ends of the first and second shaft section with respect to the axial direction, and c is a length of the mutually facing ends of the first and second shaft sections.

20. The method according to claim 13, wherein the first and second shaft sections are respectively wave-shaped at their mutually facing ends and wherein the first and second shaft sections being moved away from each other occurs at a relative twisting by a size of one crest of the wave-shape.

* * * * *